United States Patent [19]
Douillet

[11] Patent Number: 5,118,167
[45] Date of Patent: Jun. 2, 1992

[54] BRAKE CIRCUIT WITH HYDRAULIC AMPLIFICATION AND BRAKE ASSEMBLY COMPRISING SUCH A CIRCUIT

[75] Inventor: Christian Douillet, Puteaux, France

[73] Assignee: Bendix Europe Services Techniques, Drancy, France

[21] Appl. No.: 597,626

[22] Filed: Oct. 15, 1990

[30] Foreign Application Priority Data

Oct. 31, 1989 [FR] France .................. 89 14254

[51] Int. Cl.[5] ............................................. B60T 13/12
[52] U.S. Cl. ............................................. 303/92; 303/10
[58] Field of Search .................. 330/10, 11, 87, 92, 330/116 R, 116 SP

[56] References Cited

U.S. PATENT DOCUMENTS

| 4,812,777 | 3/1989 | Shirai | 303/10 X |
| 4,852,952 | 8/1989 | Kervagoret | 303/92 X |
| 4,938,541 | 7/1990 | Shaw et al. | 303/10 |

FOREIGN PATENT DOCUMENTS 403291 12/1990 European Pat. Off. ............ 303/11

2480371 10/1981 France .

Primary Examiner—George E. A. Halvosa
Assistant Examiner—Alfred Muratori
Attorney, Agent, or Firm—Larry J. Palguta; Ken C. Decker

[57] ABSTRACT

The brake circuit with hydraulic amplification of the input force is connected to a working chamber of a master cylinder (1) controlled by a brake pedal and comprises a source of fluid under high pressure (5), a brake motor (12) and a first valve (10) which, by way of a non-return valve (17), makes or breaks communication between the source of fluid under pressure (5) and the brake motor (12) as a function of the difference between the pressures of the fluid of the source and the fluid in the working chamber of the master cylinder. The brake circuit comprises, furthermore, a second valve (20) pilot-controlled by the pressure of the fluid of the source (5) and having a shutter (24) normally breaking communication between the working chamber and the brake motor (12) and making this communication in the event of a failure of the source.

6 Claims, 3 Drawing Sheets

BRAKE CIRCUIT WITH HYDRAULIC AMPLIFICATION AND BRAKE ASSEMBLY COMPRISING SUCH A CIRCUIT

BACKGROUND OF THE INVENTION

The present invention relates to a brake circuit with hydraulic amplification and to a brake assembly comprising such a circuit.

It is known that pneumatic vacuum devices used for amplifying the force exerted on the brake pedal by the driver of a vehicle take up a large amount of space, and it is often desirable to obtain a hydraulic amplification of this force. In this case, the master cylinder can be fastened directly to the panel separating the engine compartment from the passenger compartment of the vehicle, and the amplification circuits can then be arranged at any other location capable of receiving them, such a hydraulic amplification making it possible, in particular, to adapt a vehicle easily either to driving on the left or to driving on the right. However, it is also known that the basic rules of safety demand that the brake assembly should function in the conventional way in the event of a failure of the amplification circuits, albeit at the expense of a higher force exerted on the brake pedal by the vehicle driver.

The circuits of this type usually possess solenoid control valves which it is desirable to eliminate in view of their high price and their short lifetime.

SUMMARY OF THE INVENTION

The subject of the present invention is, therefore, such a circuit and the corresponding brake assembly.

The invention therefore relates more specifically to a brake circuit with hydraulic amplification of the input force, connected to a working chamber of a master cylinder controlled by a brake pedal and comprising a source of fluid under high pressure, a brake motor and a first pilot valve which, by means of a non-return valve, makes or breaks communication between the source of fluid under pressure and the brake motor as a function of the difference between the pressures of the fluid of the source and the fluid in the working chamber of the master cylinder, and a second valve pilot-controlled by the pressure of the fluid of the source and having a shutter normally breaking communication between the working chamber and the brake motor and making this communication in the event of a failure of the source.

Document FR-A-2 480 371 discloses a boosted clutch actuating device based on this principle. However, in case of source failure, it requires a very important effort to be operated.

According to the invention, the first pilot valve comprises a first chamber connected to the working chamber, a second chamber connected to the source of fluid under pressure by means of the non-return valve, and a third chamber located between the first and second chambers and connected to a reservoir of fluid under low pressure by means of a third valve pilot-controlled by the pressure of the fluid of the source, the third valve having a shutter normally making communication between the reservoir and the third chamber and breaking this communication in the event of a failure of the source of fluid under pressure. It comprises two slides in series and of different diameters which, in response to the pressure of the fluid in the working chamber of the master cylinder, open in a first stage a first shutter putting the second chamber and the brake motor in communication and in a second stage a second shutter putting the pressure source and the second chamber in communication by means of a non-return valve.

Preferably, it comprises, furthermore, a fourth valve pilot-controlled by the pressure of the source and having a shutter normally making communication between a working chamber of the master cylinder and a capacity, for determining a pedal travel and breaking the communication in the event of a failure of the source.

It will be appreciated that such a brake circuit can be duplicated in order to control separately the two conventional brake circuits connected respectively to the two working chambers of a master cylinder. However, according to the invention, a first working chamber of the master cylinder can be connected to the fourth valve, while the second working chamber is connected to the first and second valves.

In this case, preferably, the brake assembly comprises a fifth valve pilot-controlled by the pressure of the fluid of the source and having a shutter normally breaking communication between the first working chamber of the master cylinder and a first set of brake motors, and a sixth valve pilot-controlled by the pressure of the fluid of the source and comprising a shutter normally making communication between the first set of brake motors and a second set of brake motors, the first and second valves being connected to the second set of brake motors, in such a way that, in the event of a failure of the source, the master cylinder can function correctly with the two brake circuits being isolated from one another.

BRIEF DESCRIPTION OF THE DRAWINGS

The invention will now be described by way of example with reference to the accompanying drawings in which.

DETAILED DESCRIPTION OF THE INVENTION

Figure 1:
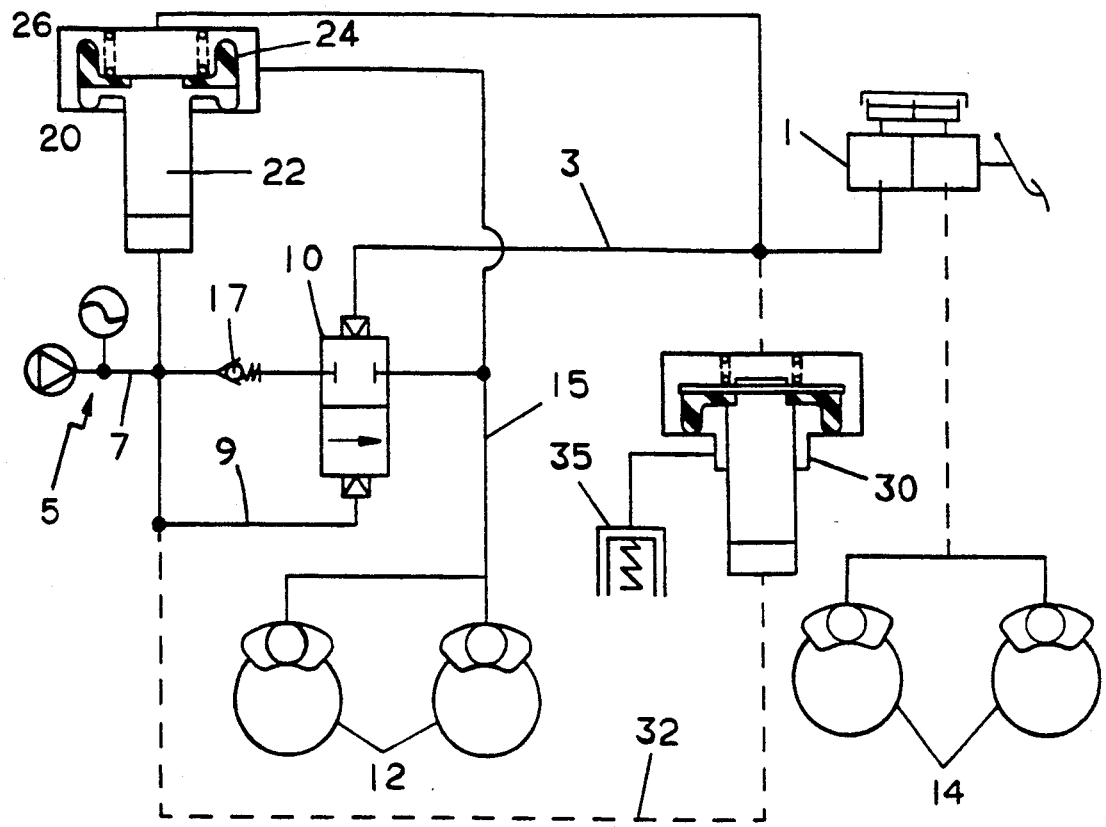
FIG. 1 shows a brake circuit according to the invention diagrammatically.

Referring now to FIG. 1, a master cylinder controlled by a brake pedal has been designated diagrammatically by the reference 1. The circuit illustrated is connected to a working chamber of the master cylinder. It is clear that another identical circuit can be connected to the other working chamber of the master cylinder in order to control another independent brake circuit.

A two-position valve 10 is pilot-controlled by the difference in the pressures prevailing in the working chamber of the master cylinder and in the source of fluid under pressure 5, here represented by a pump and an accumulator. For this purpose, the working chamber is connected to the valve 10 by means of a pipeline 3 and the source of fluid under pressure 5 is connected to the valve 10 by means of a pipeline 7, 9.

As a function of the difference between these pressures, the valve 10 makes or breaks communication between the pipeline 7 and a set of brake motors 12 by means of a pipeline 15. A non-return valve 17 arranged between the valve 10 and the source 5 makes it possible to prevent fluid under pressure from returning towards the source 5.

A valve 20 pilot-controlled by the pressure of the source 5 has a piston 22 equipped with a head forming a shutter 24 arranged in a stepped bore. When the fluid of the source 5 has a sufficient pressure to overcome the force of a return spring 26, the piston slides upwards (in the figures) and thus breaks communication between the pipelines 3 and 15 which are both connected to the widened part of the bore.

Thus, when the source of fluid under pressure 5 is functioning correctly, a force exerted on the brake pedal results in the source of fluid under pressure 5 and the brake motors 12 being put in communication until the difference in the abovementioned pressures once again brings about a break in this communication.

In the event of a failure of the source 5, the shutter of the valve 20 opens under the effect of the spring 26, putting the master cylinder 1 and the brake motors 12 in direct communication.

The circuit thus functions both with force amplification and in the event of failure.

In FIG. 1, broken lines represent a device making it possible to simulate the stroke of the piston of the master cylinder during normal operation and putting this simulation out of action in the event of a failure of the source 5. This device consists of a valve 30 pilot-controlled by the pressure of the fluid of the source 5, to which it is connected by means of a pipeline 32. This valve 30 is provided so that, during normal operation, communication is made between the pipeline 3 and a reservoir 35 forming a capacity, a spring making it possible to move the shutter in order to break this communication in the event of a failure of the source of fluid under pressure 5.

Figure 2:
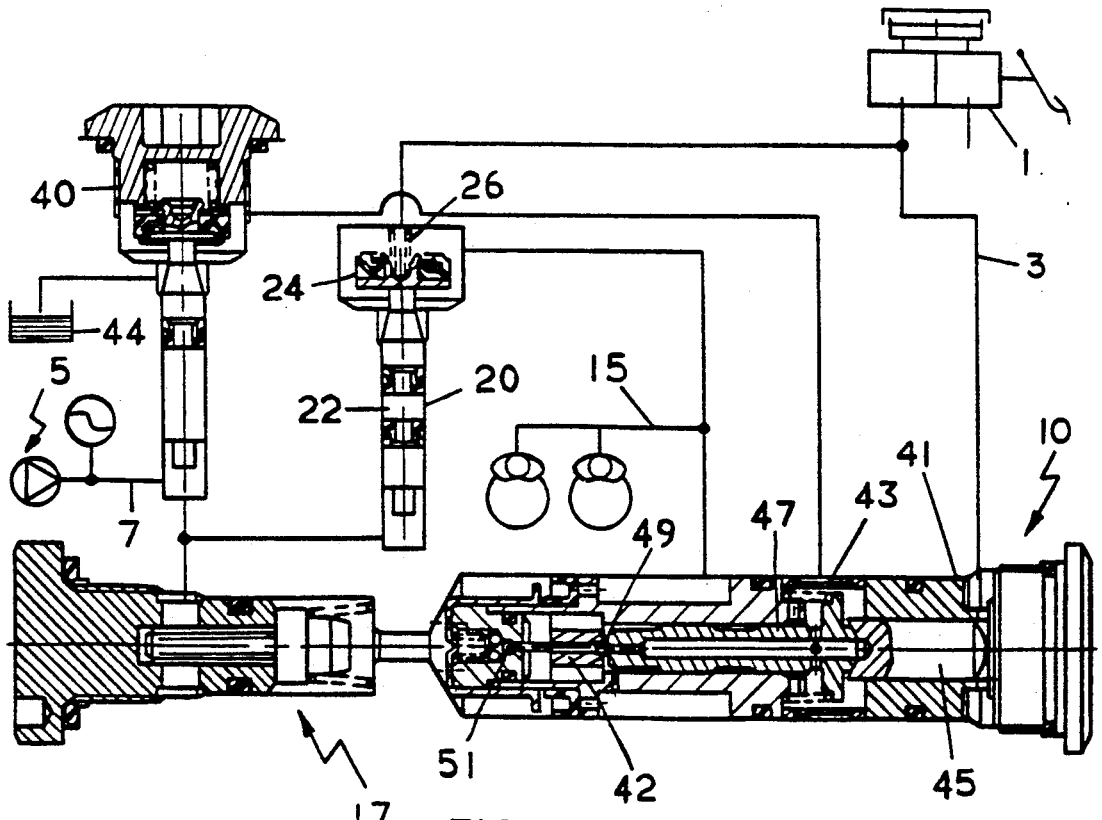
FIG. 2 shows diagrammatically, in section, a first valve pilot-controlled by the pressure difference and capable of being used in order to put the invention into practice.

FIG. 2 illustrates diagramatically an embodiment of this circuit. This figure has again the same references to designate the same elements. The pipeline 3 is connected to a first chamber 41 which is likewise connected to the valve 20.

A slide 45 is capable of sliding in a bore under the effect of the pressure in this pipeline 3 which is connected to a working chamber of the master cylinder. A second slide 47 in series with the first slide 45 is likewise capable of sliding together with the first slide. The slide 45 has a diameter larger than that of the slide 47. Because of the difference in the diameters of the two slides 45, 47, an amplification effect is obtained, thus making it possible to open the shutter 49, putting a second chamber 42 and the pipeline 15 connected to the brake motors 12 in communication, and then to open the shutter 51, putting the source of fluid under pressure 5 and the second chamber 42 in communication by means of the non-return valve 17. Of course, a third chamber 43 making it possible to isolate the source 5 and the pipeline 3 is provided between the first and second chambers 41, 42. This third chamber 43 will advantageously contain a spring making it possible to return the slides 45, 47 in the absence of pressure in the pipeline 3. This third chamber 43 is connected to a lowpressure reservoir 44 by means of a fourth valve 40, likewise pilot-controlled by the pressure prevailing in the source 5, in such a way that communication between this third chamber 43 and the reservoir 44 is normally made, but is broken in the event of a failure of the source 5, so as to prevent any harmful movement of the slides 47, 45.

Figure 3:
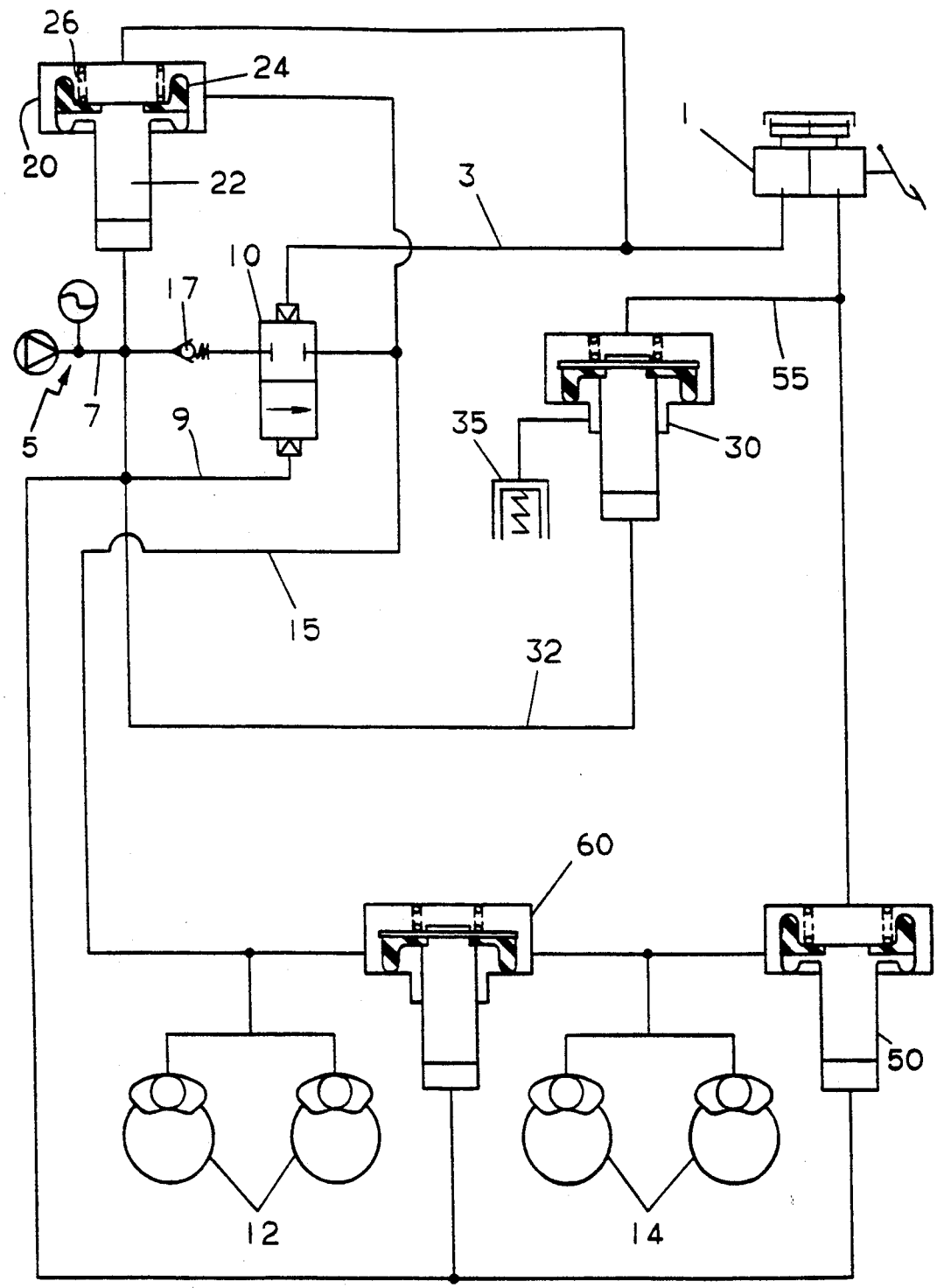
FIG. 3 illustrates a brake assembly according to the invention diagrammatically.

FIG. 3 illustrates diagrammatically a brake assembly of the same type, but in which the amplification circuit is connected to one working chamber of the master cylinder, whilst the device for simulating the pedal travel 30, 35 is connected to the other working chamber of the master cylinder 1. The common elements bearing the same references will not be described again hereafter. An average person skilled in the art will see at once from this diagram that there is a single amplification circuit for the two sets of brake motors 12 and 14 equipping the vehicle. However, to ensure safety, the master cylinder 1 will function dynamically in a conventional way, a separate working chamber being assigned to each of the sets of brake motors in the event of a failure of the force 5. For this purpose, the first working chamber of the master cylinder 1, connected to the simulation device 30, 35 by means of a pipeline 55, is likewise connected to the set 14 of brake motors by means of a fifth valve 50 pilot-controlled by the pressure of the source 5, to which it is connected by the pipeline 7. This valve 50 normally breaks the communication between the first chamber of the master cylinder and the set 14 and, in the event of a failure of the source 5, makes the communication. A sixth valve 60, likewise pilot-controlled by the pressure in the source 5, normally makes communication between the two sets 12 and 14, but breaks this communication in the event of a failure of the source 5.

Figure 4:
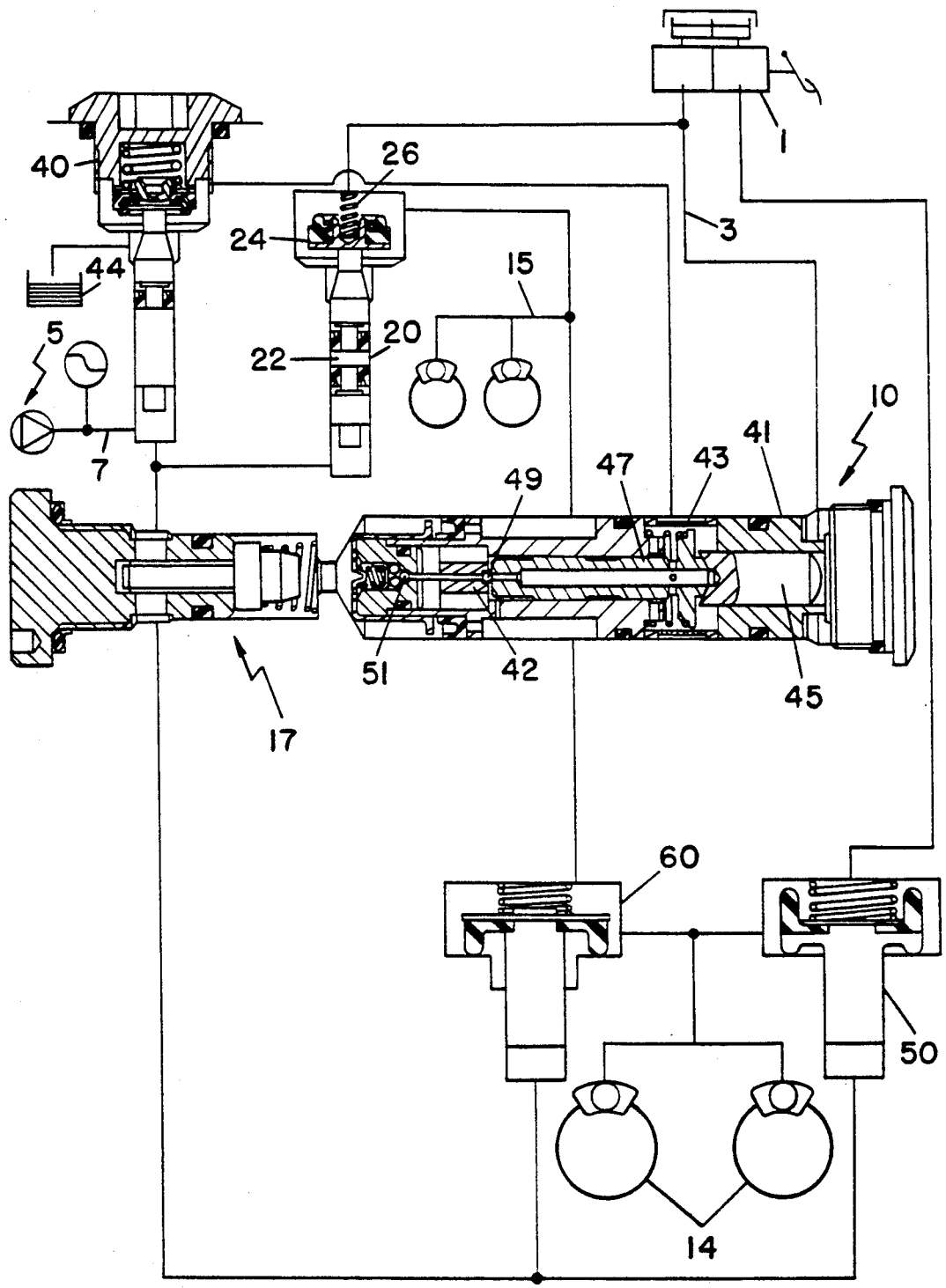
FIG. 4 illustrates a brake assembly according to the invention diagrammatically.

Thus, normally the amplification circuit is controlled by the pressure prevailing in only one working chamber of the master cylinder and acts on the two sets of brake motors, the other working chamber ensuring only the simulation of the stroke of the brake pedal. In the event of a failure of the source 5, the amplification circuit and the simulation device are put out of action, and the two sets of brake motors are isolated from one another and each connected respectively to one of the working chambers of the master cylinder which then functions dynamically as a conventional master cylinder. FIG. 4 illustrates a brake assembly of the type in FIG. 2, but in which the fifth valve 50 and sixth valve 60, of FIG. 3 have been added to provide isolation between the wheel sets.

Of course, an average person skilled in the art can make numerous modifications to the circuits, assemblies and valves described and illustrated, without departing from the scope of the present invention, as defined by the accompanying claims.

What we claim is:

1. A brake circuit with hydraulic amplification of an input force, connected to a working chamber of a master cylinder controlled by a brake pedal and comprising a source of fluid under high pressure, a brake motor and a first pilot valve which, by means of a non-return valve, makes or breaks communication between said source of fluid under pressure and said brake motor as a function of the difference between the pressures of the fluid of said source and the fluid in said working chamber of the master cylinder, and a second valve pilot-controlled by the pressure of the fluid of said source and having a shutter normally breaking communication between said working chamber and said brake motor and making the communication in the event of a failure of the source, characterized in that said first pilot valve comprises a first chamber connected to said working chamber, a second chamber connected to said source of fluid under pressure by means of said non-return valve, and a third chamber located between said first and second chambers and connected to a reservoir of fluid under low pressure by means of a third valve pilot-controlled by the pressure of the fluid of said source, said third valve having a shutter normally making communication between said reservoir and said third chamber and breaking such communication in the event of a failure of said source of fluid under pressure.

2. The brake circuit according to claim 1, characterized in that said first pilot valve comprises two slides in series and of different diameters which, in response to the pressure of the fluid in the working chamber of said master cylinder, open in a first stage a first shutter putting said second chamber and said brake motor in communication and in a second stage a second shutter putting said source of fluid under pressure and said second chamber in communication by means of a non-return valve.

3. The brake circuit according to claim 2, characterized in that it comprises, furthermore, a fourth valve pilot-controlled by the pressure of said source and having a shutter normally making communication between the working chamber of said master cylinder and a capacity, for determining a travel of said pedal, and breaking said communication in the event of a failure of the source.

4. The brake circuit according to claim 3, further comprising the working chamber being comprised of a first and second working chamber, and the circuit comprising two separate circuits connected respectively to each of said first and second chambers.

5. The brake circuit according to claim 3, further comprising the working chamber being comprised of a first and second working chamber and the first working chamber of said master cylinder being connected to said fourth valve, while the second working chamber is connected to said first and second valves.

6. The brake circuit according to claim 5, characterized in that the circuit comprises a fifth valve pilot-controlled by the pressure of the fluid of said source and comprising a shutter normally breaking communication between said first working chamber of said master cylinder and a first set of brake motor, and a sixth valve pilot-controlled by the pressure of the fluid of said source and comprising a shutter normally making communication between said first set of brake motors and a second set of brake motors, said first and second valves being connected to said second set of brake motors, in such a way that, in the event of a failure of said source, said master cylinder can function correctly with the sets of brake motors being isolated from one another.

* * * * *